US009847536B2

(12) United States Patent
Freese, V (10) Patent No.: US 9,847,536 B2
(45) Date of Patent: Dec. 19, 2017

(54) INJECTED METAL BEAD CHANNEL SEAL ACHIEVED THROUGH STAMPED PLATE FEATURES ON FUEL CELL BIPOLAR PLATES

(71) Applicant: GM Global Technology Operations LLC, Detroit, MI (US)

(72) Inventor: Charles E. Freese, V, IRA Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 162 days.

(21) Appl. No.: 14/681,504

(22) Filed: Apr. 8, 2015

(65) Prior Publication Data
US 2016/0301088 A1   Oct. 13, 2016

(51) Int. Cl.
*H01M 8/02* (2016.01)
*H01M 8/0276* (2016.01)
(Continued)

(52) U.S. Cl.
CPC ....... *H01M 8/0276* (2013.01); *H01M 8/0206* (2013.01); *H01M 8/028* (2013.01);
(Continued)

(58) Field of Classification Search
CPC .. H01M 8/0206; H01M 8/0271; H01M 8/028; H01M 2008/1095; H01M 8/0276
See application file for complete search history.

(56) References Cited

U.S. PATENT DOCUMENTS

5,776,624 A   7/1998   Neutzler
8,679,697 B1   3/2014   Skala
(Continued)

*Primary Examiner* — Mark F Huff
*Assistant Examiner* — Monique Wills
(74) *Attorney, Agent, or Firm* — Quinn IP Law (57) ABSTRACT

A fuel cell system with reduced leakage and a method of assembling a fuel cell system. Bipolar plates within the system include reactant channels and coolant channels that are fluidly coupled to inlet and outlet flowpaths, all of which are formed within a coolant-engaging or reactant-engaging surface of the plate. One or more seals are also formed on the fluid-engaging surface to help reduce leakage by maintaining fluid isolation of the reactants and coolant as they flow through their respective channels and flowpaths that are defined between adjacently-placed plates. The seal—with its combination of in-plane and out-of-plane dimensions—forms a substantially hollow volume, into which a plug is placed to reduce the tendency of the seal to form a shunted flow of the coolant or reactant around the intended active area of the plate. A fluid port intersection is integrally formed with the seal and is formed to be fluidly cooperative with the volume, and is capable of accepting the introduction of a fluent precursor of the plug material such that upon curing, the precursor material forms a substantially rigid insert that continuously fills both the volume and intersection, thereby increasing the resistance of the plug to movement and the seal to shunted flow. In one form, the geometry of the fluent material injection site is such that it promotes plug anchoring within its intended location, while also providing a manufacturing aid to visually inspect for plug installation, as well as to serve as a bipolar plate stacking alignment locator and verification.

20 Claims, 3 Drawing Sheets

(51) Int. Cl.
*H01M 8/0206* (2016.01)
*H01M 8/0271* (2016.01)
*H01M 8/028* (2016.01)
*H01M 8/0286* (2016.01)
*H01M 8/1018* (2016.01)

(52) U.S. Cl.
CPC ....... *H01M 8/0271* (2013.01); *H01M 8/0286* (2013.01); *H01M 2008/1095* (2013.01); *H01M 2250/20* (2013.01); *Y02T 90/32* (2013.01)

(56) References Cited

U.S. PATENT DOCUMENTS

2005/0095494 A1* 5/2005 Fuss .................... H01M 4/8605
429/414
2016/0329535 A1* 11/2016 Moomaw .............. H01M 10/18

* cited by examiner

INJECTED METAL BEAD CHANNEL SEAL ACHIEVED THROUGH STAMPED PLATE FEATURES ON FUEL CELL BIPOLAR PLATES

BACKGROUND OF THE INVENTION

The present invention relates generally to an apparatus and method for improved sealing within bipolar plates used in a fuel cell assembly, and more particularly to the use of a seal formed within the plate where a volume within the seal houses a plug to avoid shunted fluid flow that would otherwise traverse a bead path formed by the seal.

Fuel cells convert a fuel into usable electricity via electrochemical reaction. A significant benefit to such an energy-producing means is that it is achieved without reliance upon combustion as an intermediate step. As such, fuel cells have several environmental advantages over internal combustion engines (ICEs) for propulsion and related motive applications. In a typical fuel cell—such as a proton exchange membrane or polymer electrolyte membrane (in either event, PEM) fuel cell—a pair of catalyzed electrodes are separated by an ion-transmissive medium (such as Nafion™) in what is commonly referred to as a membrane electrode assembly (MEA). The electrochemical reaction occurs when a first reactant in the form of a gaseous reducing agent (such as hydrogen, $H_2$) is introduced to and ionized at the anode and then made to pass through the ion-transmissive medium such that it combines with a second reactant in the form of a gaseous oxidizing agent (such as oxygen, $O_2$) that has been introduced through the other electrode (the cathode); this combination of reactants form water as a byproduct. The electrons that were liberated in the ionization of the first reactant proceed in the form of direct current (DC) to the cathode via external circuit that typically includes a load (such as an electric motor, as well as various pumps, valves, compressors or other fluid delivery components) where useful work may be performed. The power generation produced by this flow of DC electricity can be increased by combining numerous such cells into a larger current-producing assembly. In one such construction, the fuel cells are connected along a common stacking dimension—much like a deck of cards—to form a fuel cell stack.

In such a stack, adjacent MEAs are separated from one another by a series of reactant flow channels, typically in the form of a gas impermeable bipolar plate that—in addition to promoting the conveyance of reactants, coolant and byproducts—provides structural support for the MEA, as well as electrical current collection or conveyance and cell-to-cell sealing. In one common form, the channels are of a generally serpentine layout that covers the majority of the opposing generally planar surfaces of each plate. The juxtaposition of the plate and MEA promotes the conveyance of one of the reactants to or from the fuel cell, while additional channels (that are fluidly decoupled from the reactant channels) may also be used for coolant delivery. In one configuration, the bipolar plate is itself an assembly formed by securing a pair of thin metal sheets (called half plates) that have the channels stamped or otherwise integrally formed on their surfaces to promote fluid engagement. The various reactant and coolant flowpaths formed by the channels on each side typically convene at a manifold (also referred to herein as a manifold region or manifold area) defined on one or more opposing edges of the plate. Examples of all of these features—as well as a typical construction of such bipolar plate assemblies that may be used in PEM fuel cells—are shown and described in commonly-owned U.S. Pat. Nos. 5,776,624 and 8,679,697, the contents of which are hereby incorporated by reference.

In a typical bipolar plate construction, a single plate assembly is formed from individual stamped plate layers that are welded together to form a laminated structure with the various fluid passages, sealing surfaces, support structures and electrically conductive surfaces. Historically, the sealing function around the plate manifolds and active area is achieved in one way through the use of separate gasket or seal assemblies where the underlying plate acts as a carrier, while in another way through cure-in-place (CIP) sealing materials placed between the adjacent plate layers during the assembly process. The CIP approach is costly and often requires long manufacturing cycle times to properly cure the seal materials, while both are only suitable for low volume applications, where high manufacturing and material costs could be tolerated.

Unfortunately, commercial automotive fuel cell applications require high volume manufacturing solutions that can produce 10,000 to 100,000 fuel cell stacks per year (each with roughly 300 to 400 cells per stack). Given that each cell requires a bipolar plate assembly on each side of the MEA, even low volume production would require more than 3 million plates be made. The above sealing approaches would be a cost-prohibitive way to achieve high volume bipolar plate production.

To overcome some of the cost and manufacturing issues related to the CIP or the discrete seal and carrier assembly approaches, the Assignee of the present invention has developed an approach for bipolar plate sealing where stamped metal bead seals (MBSs, also referred to herein more simply as "seals") are used to establish cell-to-cell sealing. While such a configuration is more compatible with the high-volume production needs mentioned above, the metal-to-metal connection makes it difficult to ensure that additional leakage paths aren't introduced where coolant or other fluids can fill the channels formed by the MBS; such channel filling would lead to the coolant or other fluids to bypass the preferred route through the cell by shunting the coolant directly to the discharge side of the plate through the volumetric space formed along the length of the metal bead seals. Such shunting could lead to parasitic losses to the cooling system pump (thereby necessitating larger, less efficient pumps), as well as lead to higher cell operating temperatures (and a more rapid deterioration of the stack). While pre-formed, sealable so-called blind plugs may be used during bi-polar plate assembly and welding operations in order to fill and seal a channel, the placement of the plug requires a high degree of precision that risks miss-installation of the plug. Moreover, such an approach is not visible for quality inspections.

SUMMARY OF THE INVENTION

It is an object of the disclosure to utilize stamped features and a sealant injection device to form coolant channel plugs within an MBS-based bipolar plate seal design. According to one aspect of the present invention, a fuel cell system includes a fuel cell stack made up of numerous cells each of which includes an MEA cooperative with a bipolar plate assembly. The bipolar plate assembly includes one or more plates each of which define a fluid-engaging surface where one or more of reactant channels and coolant channels are formed. Similarly, inlet and outlet flowpaths are formed in the fluid-engaging surface such that each are in fluid communication with a respective one of the reactant and coolant channels. To keep the respective reactant or coolant fluidly isolated while traversing the channels, one or more seals are disposed on the plate fluid-engaging surface. In this way, when the plate is facingly placed against an adjacent plate or other generally planar surface, the seal provides substantial fluid isolation; a plug material disposed within a bead channel, cavity or related volume augments the sealing by blocking the channel-like flowpath defined within the seal's internal volume.

In a preferred form, the material used for the plug is in a fluent (i.e., liquid or semi-liquid) state prior to and during introduction into the seal's channel-like flowpath. Upon curing, the plug would set up to occupy at least a portion of the volume as a substantially rigid, well-anchored material. Thus, while a substantially complete filling over the entire length of the seal's channel-like flowpath would achieve the desired blockage of the volume, a strategically-placed smaller quantity (for example, in the region adjacent the port or aperture where the material is introduced to the volume) may be used to achieve similar results without the cost or complexity associated with a complete fill.

In the present context, the amount of axial length of filling that would constitute an adjacent seal region is dependent upon the dimensions of the bipolar plate. For example, the plug length may be selected to meet the local requirements for the seal stiffness, the pressure conditions of the fluid that is being sealed, and the other factors commensurate with the plug's material properties (such as corrosion resistance, curing time to facilitate manufacturing requirements, thermal compatibility, or the like). These will define the material and its adhesion properties to the interior wall metal surface of the seal. The adhesion characteristics, the amount of compression applied by the stack assembly process, the size of the seal passage, and the operating pressures will all influence the length of the plug that would be required for it to hold its position within the channel. Likewise in the present context, the terms "rigid" and well-anchored are meant to cover one or more of those material properties and geometric shapes that are sufficient to avoid ready displacement of the plug that is disposed within the bead channel or volumetric space formed by the MBS in response to fluid pressure imparted thereto by the coolant, reactant or other leakage-prone agent that is being introduced to the volume through the bipolar plate. As such, its overall strength, stiffness and related structural properties need not be of such rigidity as that of the metal material that forms the plate. Examples of the sort of material useful for such a rigid plug include silicone, polymers or the like, so long as they exhibit other desirable corrosion, contamination or related properties. Preferably, the precursor material is introduced and cured after the bipolar plates are assembled and welded together; this helps to reduce the likelihood of errors during the assembly process. An aperture (which in one form may be stamped or otherwise formed in the MBS's sidewall) provides a positive visual verification that the channel plug is in-place, and can also serve as a manufacturing locator to ensure proper fluent material placement and stacked plate alignment. A separate projection in the MBS in the form of a T-shaped intersection feature provides a mechanical stop to anchor the channel plug (which upon curing fills both the MBS volume and the volume defined by the intersection) in order to limit plug movement along the elongate axis formed within the MBS volume or channel. In another form, the cured plug may be made from a material that provides visual indicia (such as by a contrasting color or the like) to promote ease of visual inspection that a particular seal has been filled.

According to another aspect of the present invention, a fuel cell bipolar plate is disclosed. The plate defines a fluid-engaging surface onto which either reactant channels or coolant channels are formed, depending on which fluid (i.e., reactant or coolant) is being conveyed across the plate surface. Inlet and outlet flowpaths are also defined in the surface such that each are in fluid communication with a respective one of the reactant and coolant channels; at least one seal or MBS is disposed on the surface such that upon cooperative engagement with an adjacently-placed one of the plates, the seal provides substantial fluid isolation of a reactant or coolant that is being conveyed through a respective one of the reactant and coolant channels. The seal forms a substantially hollow volume into which fits a fluent material that cures into a plug. In one preferred form, the plate fluid-engaging surface is broken up into two primary regions. A first of the regions corresponds to the reactant and flowpath channels where thermal or fluid communication is established with companion channels in an adjacently-placed plate, while the second of the regions forms a manifold that corresponds to the inlet flowpaths that deliver coolant or reactant to the active region and the outlet flowpaths that receive the coolant or reactant from the active region. In a more preferred form, the seal is made up of numerous seals, each forming a substantially peripheral path around one of the reactant and flowpath channels and the inlet and outlet flowpaths within respective active and manifold regions. As with the previous embodiment, the seal defines a volumetric cavity into which a plug may be placed, while a separate projection extends away from the MBS in the form of an intersection feature to provide a mechanical stop to anchor the plug.

According to yet another aspect of the present invention, a method of sealing a bipolar plate within a fuel cell system is disclosed. The method includes placing a pair of the plates on top of one another in a stacked configuration so that seals formed on a portion of the surface thereof reduce the tendency of reactant of coolant introduced into the bipolar plate to leak. As before, the surface of the plates is fluid-engaging in that it defines one or more of reactant channels and coolant channels, as well as inlet and outlet flowpaths to provide fluid communication with a respective one of the reactant and coolant channels. By virtue of its out-of-plane projection, the seal defines a substantially hollow volume into which a fluent material is introduced, after which the material cures such that it forms a substantially rigid plug throughout at least the portion of the seal in the immediate vicinity of the point of fluid material introduction. In one preferred form, the plate is a coolant plate, while in another preferred form, the fluid-engaging surface defines an active region corresponding to the reactant and flowpath channels and a manifold region corresponding to the inlet and outlet flowpaths. More particularly, numerous seals are formed such that each defines a substantially independent peripheral path around one of the reactant and flowpath channels and the inlet and outlet flowpaths to facilitate reactant or coolant isolation. As discussed above, the seal further defines a fluid port intersection that is fluidly cooperative with the internal seal volume and defines an aperture therein to accept the introduced fluent material. The sealing may also be verified by visual means, such as through a suitably-equipped computer based controller or analyzer system, an example of which may be found in co-pending application Ser. No. 14/547,308 entitled METHOD TO INCORPORATE SKIN AND CORE MATERIAL PROPERTIES IN PERFORMANCE ANALYSIS OF HIGH PRESSURE DIE CASTING ALUMINUM COMPONENTS that was filed on Nov.

19, 2014, is owned by the Assignee of the present invention and incorporated herein by reference in its entirety. As will be appreciated by those skilled in the art, the inclusion of a suitably-configured sensor may acquire such visual indicia of plate stacking, assembly and related manufacturing quality assurances and then convey such indicia to the computer in order to provide information about the quality of the seal-plugging or stack assembly operations.

These and other aspects or embodiments will become apparent to those of ordinary skill in the art from a reading of the following detailed description and the appended claims.

BRIEF DESCRIPTION OF THE DRAWINGS

The following detailed description of the preferred embodiments of the present invention can be best understood when read in conjunction with the following drawings, where like structure is indicated with like reference numerals and in which the various components of the drawings are not necessarily illustrated to scale.

DETAILED DESCRIPTION OF THE EMBODIMENTS

Figure 1:
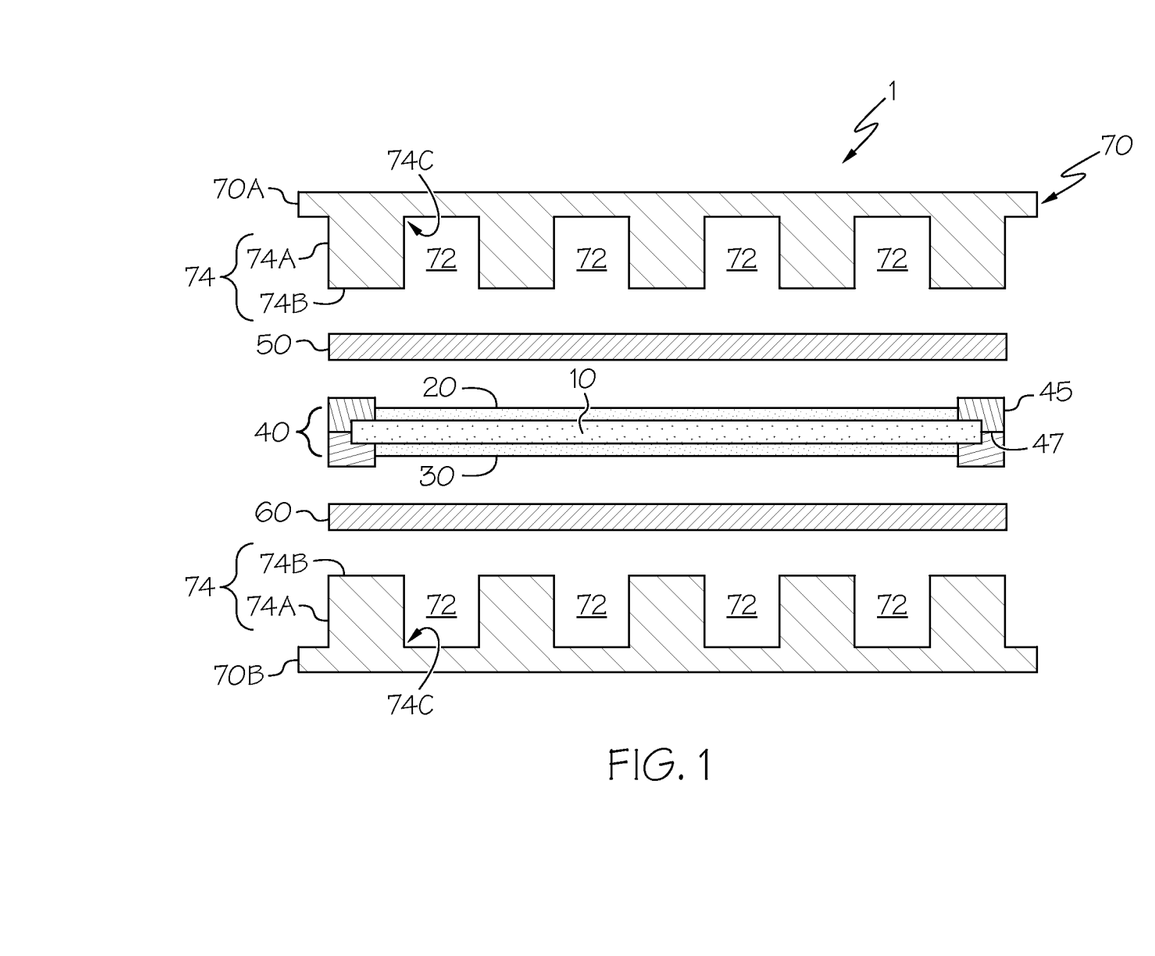
FIG. 1 is a simplified illustration of a partially exploded, sectional view of a portion of a fuel cell with surrounding bipolar plates.

Referring initially to FIG. 1, a simplified view of a PEM fuel cell 1 in exploded form is shown. The fuel cell 1 includes a substantially planar proton exchange membrane 10, anode catalyst layer 20 in facing contact with one face of the proton exchange membrane 10, and cathode catalyst layer 30 in facing contact with the other face. Collectively, the proton exchange membrane 10 and catalyst layers 20 and 30 are referred to as the MEA 40. An anode diffusion layer 50 is arranged in facing contact with the anode catalyst layer 20, while a cathode diffusion layer 60 is arranged in facing contact with the cathode catalyst layer 30. Each of diffusion layers 50 and 60 are made with a generally porous construction to facilitate the passage of gaseous reactants to the catalyst layers 20 and 30. Collectively, anode catalyst layer 20 and cathode catalyst layer 30 are referred to as electrodes, and can be formed as separate distinct layers as shown, or in the alternate (as mentioned above), as embedded at least partially in diffusion layers 50 or 60 respectively, as well as embedded partially in opposite faces of the proton exchange membrane 10. In one form, a plastic frame in the form of a sub-gasket 45 may also be included to protect the edge of the MEA 40. This sub-gasket 45 is often used to extend the separation of gases and electrons between the catalyst layers 20 and 30 to the edge of MEA 40, and is often placed where the elastomeric seal comes into contact with the MEA 40. This helps reduce overboard leaks of gases and coolant, as well as inter-mixing of gases and coolant at the manifold region. In some cases, an elastomeric seal can be attached or directly formed onto the sub gasket 45 as part or extension of the MEA 40; either variant is deemed to be within the scope of the present invention.

In addition to providing a substantially porous flowpath for reactant gases to reach the appropriate side of the proton exchange membrane 10, the diffusion layers 50 and 60 provide electrical contact between the electrode catalyst layers 20, 30 and a bipolar plate 70 that in turn acts as a current collector. Moreover, by its generally porous nature, the diffusion layers 50 and 60 also form a conduit for removal of product gases generated at the catalyst layers 20, 30. Furthermore, the cathode diffusion layer 60 generates significant quantities of water vapor in the cathode diffusion layer. Such feature is important for helping to keep the proton exchange membrane 10 hydrated. Water permeation in the diffusion layers can be adjusted through the introduction of small quantities of polytetrafluoroethylene (PTFE) or related material.

Although shown notionally as having a thick-walled attributes, bipolar plates 70 preferably employ sheet-like or foil-like structure (as will be shown and described in more detail below); as such, FIG. 1 should not be used to infer the relative thickness between the channels 72 and the plate structure that gives definition to such channels. Moreover, the generally serpentine flowpath patterns of channels 72 (which are shown in greater detail in FIG. 2) are understood to be exemplary. As such, other patterns that may be optimized for performance of a particular fuel cell configuration are also within the scope of the present disclosure. Furthermore, although bipolar plate 70 is shown (for stylized purposes) defining purely rectangular reactant gas flow channels 72 and structure 74, it will be appreciated by those skilled in the art that a more accurate (and preferable) embodiment will be shown below, where generally serpentine-shaped channels 72 (along with their respective generally planar apexes that correspond to the lands 74B) are formed. As shown, simplified opposing surfaces 70A and 70B of a pair of bipolar plates 70 are provided to separate each MEA 40 and accompanying diffusion layers 50, 60 from adjacent MEAs and layers (neither of which are shown) in a stack. One plate 70A engages the anode diffusion layer 50 while a second plate 70B engages the cathode diffusion layer 60. Each plate 70A and 70B (which upon assembly as a unitary whole would make up the bipolar plate 70) defines numerous reactant gas flow channels 72 along a respective plate face. Three-dimensional (i.e., out-of-plane) structure 74 is made up of walls 74A and lands 74B that separate adjacent sections of the reactant gas flow channels 72 by projecting toward and making direct contact with the respective diffusion layers 50, 60.

In operation, a first gaseous reactant, such as $H_2$, is delivered to the anode 20 side of the MEA 40 through the channels 72 from plate 70A, while a second gaseous reactant, such as $O_2$ (typically in the form of air) is delivered to the cathode 30 side of the MEA 40 through the channels 72 from plate 70B. Catalytic reactions occur at the anode 20 and the cathode 30 respectively, producing respective protons at the anode 20 that migrate through the proton exchange membrane 10 and electrons at the cathode 30 that result in an electric current that may be transmitted through the diffusion layers 50 and 60 and bipolar plate 70 by virtue of contact between the lands 74B and the layers 50 and 60.

In a manner generally similar to the shown reactant-conveying channels, related channels (not shown) may be used to convey coolant to help control temperatures produced by the fuel cell 1. Such plates may be formed on separate surfaces (for example, on the respective top and bottom surfaces) of the first and second plates 70A and 70B Likewise, the plates 70A, 70B may be formed of multiple built-up sheets (such as by the lamination of thinner stacked layers or the like); this may help facilitate the formation of a substantially enclosed volume within the seals, as will be discussed in more detail below. Regardless of the construction, such plate varieties (whether coolant-carrying or other fluid-carrying) are understood within the present context to otherwise include comparable features as their reactant-conveying plate counterparts; as such, structural details associated with the surface-defining features are deemed to be comparable. Furthermore, those skilled in the art will recognize that the channel sealing design that is described in the present invention is also applicable to non-fuel cell applications where a coolant flow is shunted through the back of a formed geometric sealing surface.

Figure 2:
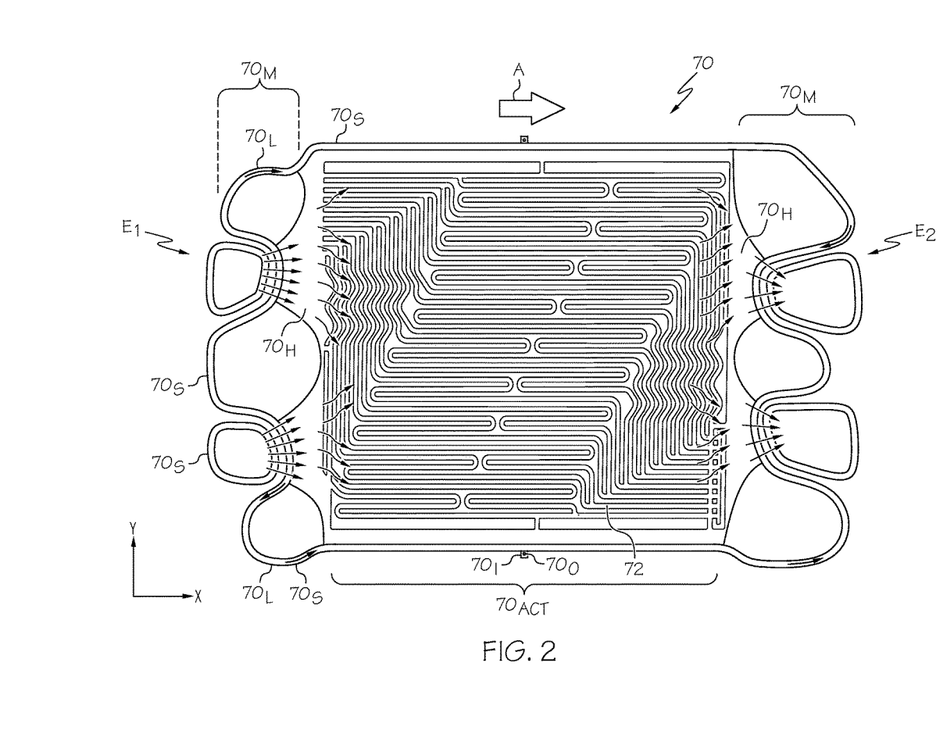
FIG. 2 is a top detailed view of a bipolar plate from FIG. 1 that includes a metal bead seal according to an aspect of the present invention.

Referring next to FIG. 2, the bipolar plate 70 of FIG. 1 is shown in more detail. In particular, the plate 70 includes both an active area $70_{ACT}$ and a manifold area $70_M$, where the former establishes a planar facing relationship with the electrochemically active area that corresponds to the MEA 40 and diffusion layers 50 and 60 and the latter corresponds an edge (as shown) or peripheral (not shown) area where apertures formed through the plate 70 may act as conduit for the delivery and removal of the reactants, coolant or byproducts to (or from) the stacked fuel cells. As can be seen from the exploded view of FIG. 1, these two plates 70A, 70B may be used to form a sandwich-like structure with the MEA 40 and anode and cathode diffusion layers 50, 60 and then repeated as often as necessary to form a fuel cell stack (not shown). In one form, one or both of the anode plate 70A and cathode plate 70B are made from a corrosion-resistant material (such as 304 SS or the like). The generally serpentine gas flow channels 72 form a tortuous path from near one edge $E_1$ that is adjacent one manifold area $70_M$ of the bipolar plate 70 to near the opposite edge $E_2$ that is adjacent the opposing manifold area $70_M$. As can be seen in FIG. 2, the reactant (in the case of a plate 70 placed in facing relationship with the MEA 40) or coolant (in the case of a plate 70 placed in facing relationship with the back of another plate 70 where coolant channels are formed) is supplied to channels 72 from a series of repeating gates or grooves that form a header $70_H$ that lies between the active area $70_{ACT}$ and the manifold area $70_M$ of one (for example, supply) edge $E_1$; a similar configuration is present on the opposite (for example, exhaust) edge $E_2$. In an alternate embodiment (not shown), the supply and exhaust manifold areas can lie adjacent the same edge (i.e., either $E_1$ or $E_2$) of the bipolar plate 70. In situations where the bipolar plate 70 is made from a formable material (such as the aforementioned stainless steel) the various surface features (including the grooves, channels or the like) may be stamped or otherwise formed through well-known techniques. Arrow A shows the general flow direction of the reactant or coolant from the inlet of the leftmost manifold area $70_M$, through the active area $70_{ACT}$ and into the rightmost manifold area $70_M$. In this way, there is a dedicated and direct fluid communication established between both an inlet formed in the leftmost manifold area $70_M$ and an outlet in the rightmost manifold area $70_M$ through the respective gas flow channels 72 (whether coolant or reactant) that make up the active area $70_{ACT}$.

In the present context, the stacking axis of the fuel cell 1 may be along a substantially vertical (i.e., Z) Cartesian axis so that the majority of the surface of each of the bipolar plates 70 is in the X-Y plane. Regardless, it will be appreciated by those skilled in the art that the particular orientation of the cells 1, plates 70 and stack isn't critical, but rather provides a convenient way to visualize the landscape that is formed on the surfaces of the plates 70.

Figure 3:
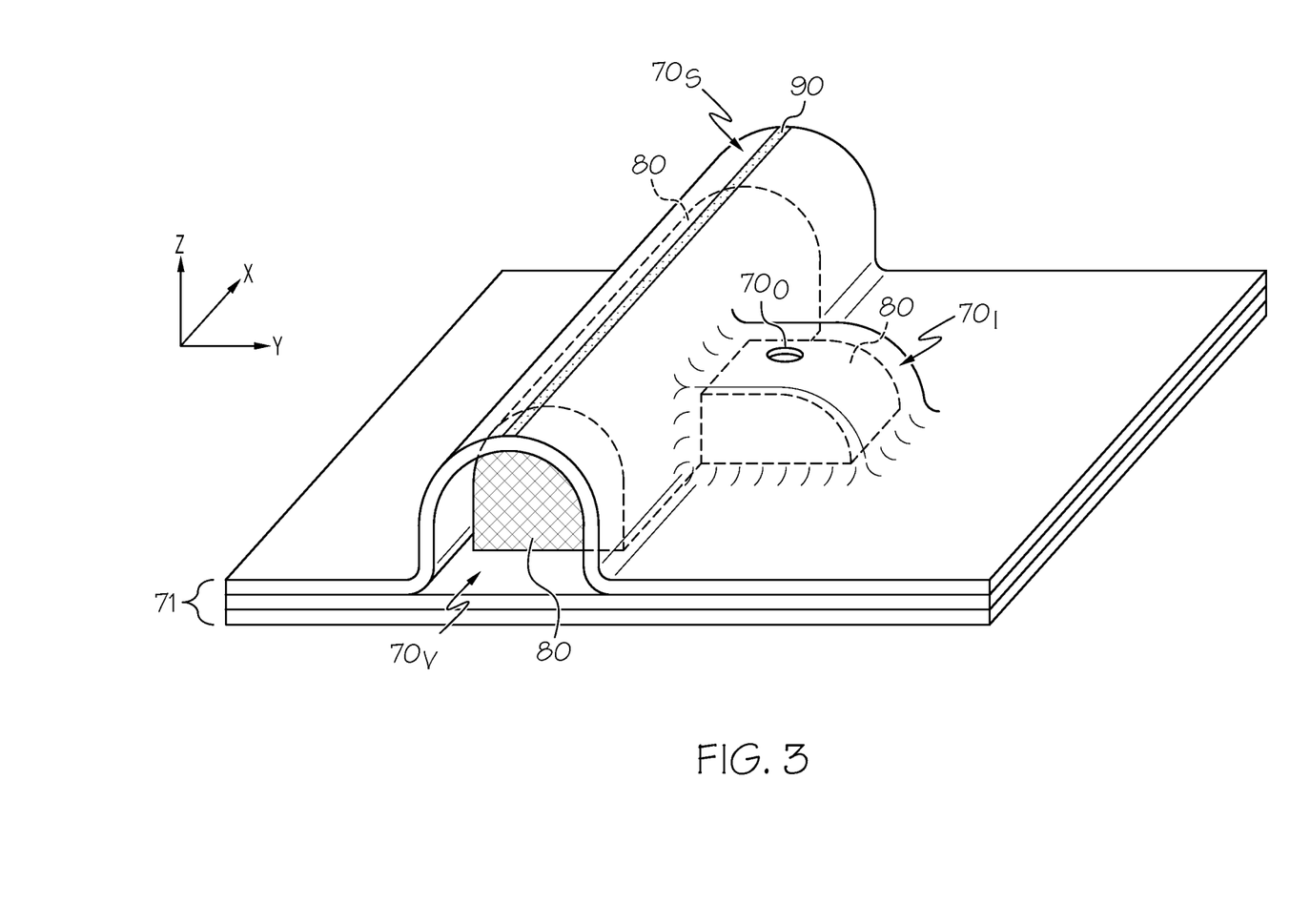
FIG. 3 is a simplified perspective view of an embodiment of the metal bead seal of FIG. 2 with filled plug according to an aspect of the present invention.

Referring next to FIG. 3 in conjunction with FIG. 2, one or more seals (i.e., MBS) $70_S$ are formed into the fluid-engaging surface of the bipolar plate 70. As with the grooves, channels and other features mentioned above, the seals $70_S$ may be formed by stamping or other forming operations, and are shaped to provide fluidly-isolatable regions around the various inlets, outlets and serpentine channels that make up the various regions that are formed over the surface of the plate 70. In one preferred form, seal $70_S$ defines a trough-like internal volume $70_V$ with a semi-circular cross-sectional profile) that is about 2.8 mm wide and about 1.3 mm deep, although other shapes and sizes may be used, depending on the sealing needs of the bipolar plate 70. As mentioned above, in one form, the bipolar plate 70 may be made from a laminated stack 71 of thin sheets. As will be discussed in more detail below, the present invention avoids the problem of shunted leakage fluid $70_L$ (shown by the arrows at the top and bottom of FIG. 2) by blocking the volume $70_V$ with a filler material.

The seals $70_S$ generally form peripheral racetrack-like features that project out of the XY plane of the plate 70 fluid-engaging surface along the Z-axis to give the plate 70 slightly three-dimensional attributes; when facingly-adjacent plates 70 are stacked relative to one another, the seals $70_S$ come into contact with one another to provide enhanced resistance to coolant or reactant leakage across their boundary. In a similar fashion, the generally planar lower surface on an adjacently-placed plate 70 (not shown) may also be made to contact the top of seal $70_S$ that projects along the Z-axis to produce a comparable contact; either contact variant is deemed to be within the scope of the present invention. Additionally, a microseal 90 may be formed along part of all of the length of seal $70_S$.

In the version shown, an intersection $70_I$ is formed lateral (i.e., along the Y-axis) relative to seals $70_S$ at one or more locations along the axial length of the seals $70_S$. In the embodiment shown, the intersection $70_I$ defines a side-branching T-shape, while the contiguous nature of its internal cavity and that of the volume $70_V$ helps ensure that the material—upon curing into a plug 80—will have a shape or related geometric feature to promote its secure anchoring within the combined volume $70_V$ to further reduce the tendency of the plug 80 to move axially in response to impingement by the pressurized reactant, coolant or other fluid agent. In one form, the intersection $70_I$ may define an integral part of seal $70_S$, while its open cavity-like structure helps ensure a continuity with the volume $70_V$ formed along the axial dimension of the seal $70_S$. In this way, intersection $70_I$ forms a separate, dead-ended branch that accepts a continuous mass of fluent material that makes up the plug 80. Although shown presently as having a substantially perpendicular intersection such that a T-shaped connection is formed, the joining angle between seal $70_S$ and intersection $70_I$ may be varied, and all such forms are deemed to be within the scope of the present invention. The intersection $70_I$ is constructed such to avoid interference with the sealing functionality of the seal $70_S$ geometry. For example, the Z-axis of the intersection $70_I$ is preferably no more than, and even more particularly less than the adjacent seal $70_S$. In addition, intersection $70_I$ is preferably placed in non-sensitive portion of the perimeter of seal $70_S$; this is best depicted in FIG. 2, where the intersection $70_I$ is situated near the middle of a long linear portion of the channel formed by seal $70_S$, and away the more sensitive manifolds $70_M$. Of course, in the event that an injection site other the "T-shaped" injection site shown is not used, a curved section may be needed to help anchor the plug within the desired position within seal $70_S$.

With regard to such a configuration (not shown) where the intersection $70_I$ is removed altogether, a direct injection site (via, for example, an aperture similar to aperture $70_O$ but instead placed in the X-Y into the side of seal $70_S$) is formed. Even though there is technically no interference between the inner wall of seal $70_S$ and the plug 80, when the elastomer is injected into the $70_S$, it would instead form a line-to-line fit. Depending upon the material, it could even contract during the curing process. Regardless, the geometric variation would occur along the axis of the flow passage (i.e., the X-axis direction as shown in FIG. 3). However, when the stack is assembled and is placed under compression, the compressive force would deform the $70_S$ in the Z-axis direction, which would have the effect of putting the plug 80 into a compressed state; such compression could help anchor the plug, even in configurations where the aforementioned "T-shaped" geometry of intersection $70_I$ is used. As such, the fit between the inner walls defined by volume $70_V$ is sufficient to anchor the plug 80. Moreover, this may be augmented by using a precursor material that has a suitably high coefficient of friction such that anchoring contact between the plug 80 and such inner walls is further enhanced. Thus, and regardless of whether a side-branching intersection $70_I$ is included, the present inventor has determined that the friction between the plug 80 and inner wall of volume $70_V$ is adequate to anchor the plug 80 in place as a way to resist movement under any leakage-imposed load. As such, versions with or without shape-specific anchoring features are deemed to be within the scope of the present invention.

The plug 80 is preferably made from an injectable, elastic, compliant material (such as the aforementioned silicone, elastomer, polymer or the like) that can be cured once injected. In addition to having a suitably high coefficient of friction, other desirable properties of the precursor material preferably include corrosion resistance, contamination avoidance, stiffness properties (durometer) as a function of the amount of mechanical deformation imparted during stack compression, and sufficient bonding with the metal surfaces of the internal volume of the bead channels that make up seals $70_S$ to promote plug formation upon curing. Significantly, the presence of the plug 80 promotes a blocking action within the volume $70_V$ such that it changes the so-called "path of least resistance" away from the seals $70_S$ that could otherwise exist. In particular, the presence of the plug 80 within the volume $70_V$ formed by seal $70_S$ helps to reduce the tendency of the racetrack-like flowpath or channel that is defined by volume $70_V$ to permit coolant or reactant flow to shunt (i.e., bypass) around the active region $70_{ACT}$. During the plug-forming operation, a sufficient quantity of the fluent sealant material would be injected to cause it to flow into the volume $70_V$ and occupy a significant entirety of the cross-sectional area defined within the seal $70_S$ such that it prevents (depending on which channels 72 within the bipolar plates 70 are being utilized) reactant or coolant that has entered the seal $70_S$ from traveling along the axial length of seal $70_S$ beyond where the plug 80 is placed.

Although preferably made from a relatively compliant material, plug 80 may change the stiffness of the seal $70_S$; this may become a larger factor in configurations where the plug 80 is only injected over a short section of the seal $70_S$, where it can cause localized changes in stiffness and sealing properties that may not be present in configurations where the plug 80 is injected over the entire length of the seal $70_S$. In such circumstances, proper selection of the precursor material properties is beneficial in that a property (such as the durometer value for stiffness or hardness) is properly matched to the requirements of the seal $70_S$. Thus, along differing places within the volume $70_V$, the plug may be made up of differing material hardness values. In other embodiments (not shown) the geometry and sealing requirements for the seal $70_S$ will vary over the surface of the bi-polar plate 70. In yet another embodiment, multiple different precursor materials may be injected in various locations (such as through various apertures $70_O$ spread along the length or periphery of the seal $70_S$; in this way, the seal $70_S$ and its sealing properties may be "tuned" in accordance with the bi-polar plate 70 geometry and material stiffness requirements at various positions around the plate 70. For example, the large seals seal $70_S$ around the manifold area $70_M$ may require different seal properties than the long passages along the active area $70_{ACT}$.

As mentioned above, an aperture (i.e., opening) $70_O$ is formed through either the intersection $70_I$ (as shown) or a sidewall defined in seal $70_S$ to define a port for injecting the precursor material that will become the channel plug 80; it also serves the additional functions of providing an access point to verify that the channel plug was created during the manufacturing process, as well as serving as a manufacturing locator to aid plate assembly and aligned stacking. This promotes ease of subsequent inspection activities (either visually, or by an automated detector coupled to a suitable computer or related controller). As additionally mentioned above, the plug 80 employs suitable material properties (such as mechanical strength, corrosion resistance, curing time or the like) commensurate with its intended function without interfering with the cell-to-cell seal $70_S$ functional requirements related to compressibility, electrical conductivity or the like. In a preferred form, the fluent precursor material is injected via aperture $70_O$ to fill both the T-shaped intersection $70_I$ and at least an adjacent portion of the main channel or volume of seal $70_S$, thereby creating the desired anchoring and consequent blockage of the channel to leakage fluid flow. As mentioned above, the nature of such anchoring is secure enough (regardless of whether the additional anchoring due to the presence of additional contiguous material in the intersection $70_I$ is present) to reduce the tendency of plug 80 to move under an axial fluid load that arises out of leakage into the channel (such as that of leaked coolant, reactant or the like). As mentioned above, in the configuration depicted in the figure, only the region immediately adjacent the aperture $70_O$ where the material is introduced to the volume $70_V$ need be used to achieve the desired blocking effect without the cost or complexity associated with completely filling the volume $70_V$ over the entire flowpath length of seal $70_S$.

Although not shown, one particular application for a system based on a stack of PEM fuel cells 1 could be an automobile or related vehicle. Within the present context, it will be appreciated that the term "vehicle" may apply to car, truck, van, sport utility vehicle (SUV) or other such automotive forms such as buses, aircraft, watercraft, spacecraft and motorcycles; all are deemed to be made cooperative with the present invention for the purposes of generating propulsive or motive power.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

In the present context, the terms relating to the channels, flowpaths and other coolant-conveying or reactant-conveying features formed into or on the fluid-engaging surfaces of the bipolar plates 70 are interchangeably referred to in the singular or the plural. While the distinction between whether such refers to an individual channel or flowpath of a group of them aligned along a generally parallel flowpath is not critical to the seals 70$_S$ of the present invention; as such, any particular identification of one over the other will be apparent from the context, and either are deemed to be within the scope of the present invention.

For the purposes of describing and defining the present invention, it is noted that the terms "substantially" and "approximately" and their variants are utilized herein to represent the inherent degree of uncertainty that may be attributed to any quantitative comparison, value, measurement or other representation. The term "substantially" is also utilized herein to represent the degree by which a quantitative representation may vary from a stated reference without resulting in a change in the basic function of the subject matter at issue.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

I claim:

1. A fuel cell system defining a plurality of fuel cells arranged in a stacked configuration, each of the cells within the system comprising:
   a membrane electrode assembly; and
   a bipolar plate placed in fluid cooperation with the membrane electrode assembly, the plate defining a fluid-engaging surface and comprising:
      at least one of reactant channels and coolant channels defined in the fluid-engaging surface;
      inlet and outlet flowpaths defined in the fluid-engaging surface such that both are in fluid communication with a respective one of the reactant and coolant channels;
      at least one seal disposed on the fluid-engaging surface such that upon cooperative engagement with an adjacently-placed one of the plates, the seal provides substantial fluid isolation of a fluid that is being conveyed through a respective one of the reactant and coolant channels, the seal defining a substantially hollow volume and a fluent material introduction aperture formed therein; and
      a plug disposed within at least a portion of the volume that is adjacent the aperture, the plug defined by at least a portion of fluent material being introduced through the aperture such that upon curing the plug forms a substantially rigid insert that substantially blocks leakage flow through the volume,
   wherein the plug is defined by differing material hardness values at various locations within the at least one seal.

2. The fuel cell system of claim 1, wherein the cooperative engagement between the seal on a first of the stacked plates and an adjacently-placed second of the stacked plates comprises contact between the seal disposed on the first plate and a substantially planar surface of the second plate.

3. A vehicle comprising the fuel cell system of claim 1.

4. A fuel cell bipolar plate defining a substantially planar fluid-engaging surface, the plate comprising:
   at least one of reactant channels and coolant channels defined in the fluid-engaging surface;
   inlet and outlet flowpaths defined in the fluid-engaging surface such that both are in fluid communication with a respective one of the reactant and coolant channels;
   at least one seal disposed on the fluid-engaging surface such that upon cooperative engagement with an adjacently-placed one of the plates, the seal provides substantial fluid isolation of a fluid that is being conveyed through a respective one of the reactant and coolant channels, the seal defining a substantially hollow volume and a fluent material introduction aperture formed therein; and
   a plug disposed within at least a portion of the volume that is adjacent the aperture, the plug defined by at least a portion of fluent material being introduced through the aperture such that upon curing the plug forms a substantially rigid insert that substantially blocks leakage flow through the volume,
   wherein the plug is defined by differing material hardness values at various locations within the seal.

5. The plate of claim 4, wherein the fluid-engaging surface defines (a) an active region corresponding to the reactant and flowpath channels, and (b) a manifold region corresponding to the inlet and outlet flowpaths.

6. The plate of claim 5, wherein the seal comprises a plurality of seals, each forming a substantially peripheral path around one of the reactant and flowpath channels and the inlet and outlet flowpaths within respective active and manifold regions.

7. The plate of claim 4, wherein the seal is integrally formed as a part of the fluid-engaging surface.

8. The plate of claim 7, wherein the seal defines a substantially peripheral path around at least one of an active region and a manifold region that are defined within the fluid-engaging surface.

9. The plate of claim 8, wherein the aperture is defined in an intersection that is formed in the seal such that the intersection defines a laterally projecting additional volume in the seal.

10. The plate of claim 4, wherein the plate is formed of a laminate of at least two sheets such that a lower sheet defines a substantially planar lower surface and an upper plate defines the fluid-engaging surface so that the volume is defined by cooperative engagement of the two sheets.

11. A method of sealing a bipolar plate within a fuel cell system, the method comprising:
   placing at least a pair of plates on top of one another in a stacked configuration, at least one of the plates defining a fluid-engaging surface thereof and comprising:
      at least one of reactant channels and coolant channels defined therein;
      inlet and outlet flowpaths defined therein such that each are in fluid communication with a respective one of the reactant and coolant channels; and
      at least one seal disposed on the fluid-engaging surface such that upon cooperative engagement between the pair of plates, the seal provides substantial fluid isolation of a reactant or coolant that is being conveyed through a respective one of the reactant and coolant channels, the seal defining a substantially hollow volume therein; and
   introducing a fluent material into an aperture formed in the volume such that the volume occupies a substantial cross-sectional entirety defined by the volume at least in a region within the seal that is adjacent a location within the seal where the fluent material is introduced; and curing the material such that it forms a substantially rigid plug in the seal region, the plug defining differing material hardness values at various locations within the seal region.

12. The method of claim 11, wherein the fluid-engaging surface defines a coolant path.

13. The method of claim 11, wherein the fluid-engaging surface defines (a) an active region corresponding to the reactant and flowpath channels, and (b) a manifold region corresponding to the inlet and outlet flowpaths.

14. The method of claim 13, wherein the seal comprises a plurality of seals, each forming a substantially peripheral path around one of the reactant and flowpath channels and the inlet and outlet flowpaths within respective active and manifold regions.

15. The method of claim 14, wherein the aperture is defined in an intersection that is fluidly cooperative with the volume.

16. The method of claim 11, further comprising establishing visual indicia of a presence of the fluent material within the volume.

17. The method of claim 16, wherein the visual indicia is defined by the fluent material being formed with a pigment that provides a color contrast relative to the seal.

18. The method of claim 16, wherein establishing visual indicia comprises using a computer controlled vision system.

19. The method of claim 11, further comprising establishing visual indicia with the aperture to indicate alignment of the at least a pair of the plates within the stacked configuration.

20. The method of claim 19, wherein placing at least a pair of plates on top of one another in a stacked configuration comprises laser welding the plates together into a bipolar plate assembly prior to introducing the fluent material.

* * * * *